May 16, 1944.   F. T. TURNER   2,349,125
ELECTROMECHANICAL VIBRATOR SYSTEM
Filed Nov. 30, 1942   2 Sheets-Sheet 1

INVENTOR
FRANK T. TURNER
BY
Pennie, Davis, Marvin & Edmonds
ATTORNEYS.

May 16, 1944.    F. T. TURNER    2,349,125
ELECTROMECHANICAL VIBRATOR SYSTEM
Filed Nov. 30, 1942    2 Sheets-Sheet 2
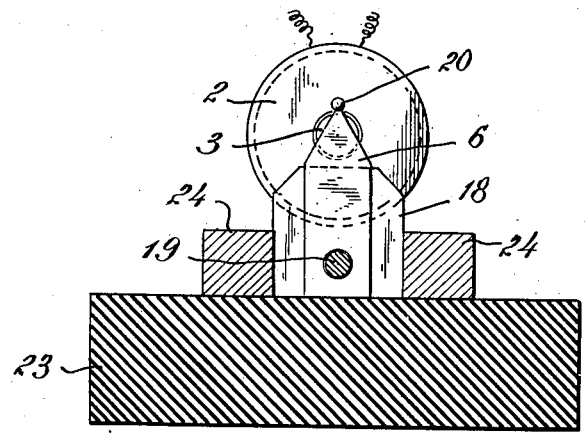
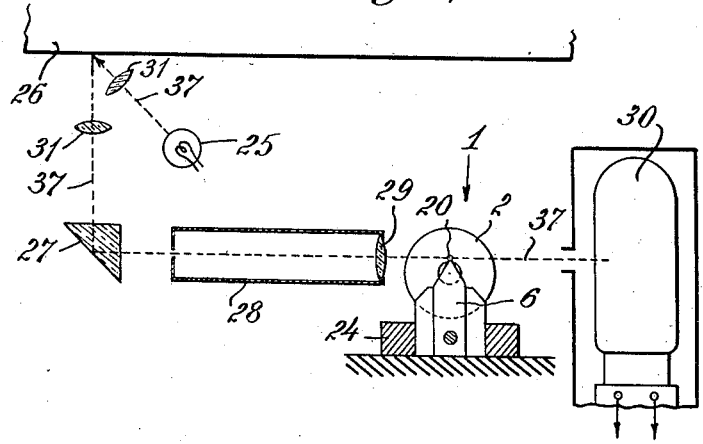
INVENTOR
FRANK T. TURNER
BY
Pennie, Davis, Marvin & Edmonds
ATTORNEYS.

Patented May 16, 1944

2,349,125

UNITED STATES PATENT OFFICE 2,349,125

ELECTROMECHANICAL VIBRATOR SYSTEM

Frank T. Turner, Brooklyn, N. Y., assignor to King Features Syndicate, Inc., New York, N. Y., a corporation of New York Application November 30, 1942, Serial No. 467,471

7 Claims. (Cl. 88—61)

This invention relates to electromechanical vibrator systems and to vibrator units employed in such systems. Although the invention has general applicability, it is especially applicible to facsimile or picture transmission systems.

It is the purpose of the present invention to provide a vibrator system at least as accurate as, and more simple and reliable than those heretofore available. To this end the system of the invention includes a vibrator unit of which the vibrating element varies the capacity of an electrostatic condenser which is connected in the control circuit of an amplifier, the output circuit of the amplifier being connected to actuate the mentioned vibrating element. Thus the only moving part is a vibrating reed which may be extremely small; furthermore, all moving electrical contacts are eliminated and the clumsy feedback arrangements and frequency controls formerly used are avoided.

These and other advantages introduced by this invention will be apparent from the following description taken in connection with the accompanying drawings wherein:

Fig. 4 is a vertical section taken along line 4—4 of Fig. 2; and

Fig. 5 is a schematic drawing of the invention employed as a "light chopper" in apparatus for facsimile transmission.

Figure 1:
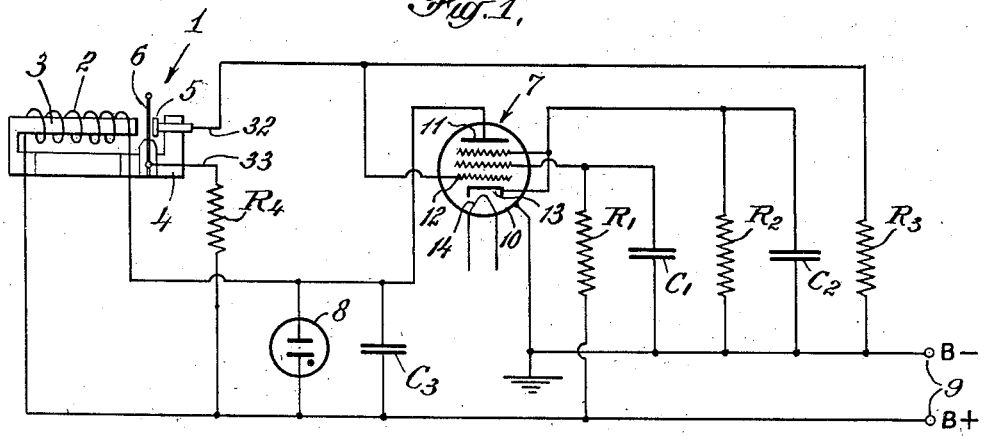
Fig. 1 is a circuit diagram showing an electromechanical vibrating system in accordance with the invention.

The principle of the invention will be readily understood by reference to Fig. 1 which is a circuit diagram of a preferred embodiment of the invention. In this diagram the electromechanical vibrator 1, which will be described in detail in connection with the remaining figures, comprises a vibrating reed 6 spaced in close proximity to an electrode or condenser plate 5 insulated therefrom. Reed 6, or at least the portion of the reed which is opposite to plate 5, should be of conducting material so that together with plate 5 it forms an electrostatic condenser. It will be evident that when reed 6 vibrates and moves toward and away from fixed plate 5 the spacing between the plates varies and thus the electrostatic condenser capacity varies. Condenser 5, 6 is connected to the input circuit of an amplifier tube 7. The output or anode circuit of amplifier tube 7 is, in turn, completed through winding 2 on an electromagnet core 3. This core is in magnetic relation to vibrating reed and condenser plate 6 so that when coil 2 is energized a force is exerted on reed 6 tending to move it with respect to the end of core 3 and also plate 5. From this it will be seen that an initial movement of reed 6 will vary the capacity of the condenser 5, 6 which in turn will vary the condenser potential which is also the control potential impressed on control grid 12 of tube 7. The result of this variation in control potential is to vary the anode current derived from potential source 9 and which flows through electromagnet coil 2. This variation in current through coil 2 produces a corresponding variation in the magnetic flux from core 3 and this variation in flux vibrates the moving element, viz., reed 6. If the electric circuits are properly adjusted reed 6 will in that manner be caused to vibrate continuously at or close to its own natural frequency, and will, if desired, continue to vibrate with considerable accuracy over long periods of time without attention.

Although from the foregoing general description it will be clear that any suitable type of amplifier may be employed in this vibrator system, an amplifier which has been used with considerable success, and is therefore illustrated by way of example, employs a tube of the pentode type presently known as type 6SJ7. Accordingly, the amplifier circuit illustrated will now be described in more detail. As shown in the diagram, condenser plates 5 and 6 are connected in the input or control circuit of tube 7, plate 5 being connected through lead 32 directly to control grid 12, and plate 6 being connected through lead 33 and resistor $R_4$ to the source 9 of anode potential. Reed 6 (in this case acting as a condenser plate) is connected to the high-potential side of anode voltage supply 9, rather than to the low-potential side, in order to impress on the condenser 5, 6 a constant potential so that changes in condenser capacity will produce variations in control potential impressed on control grid 12, in accordance with the vibratory motion of reed 6. Resistor $R_4$, which may for example be of about 1 megohm resistance, is provided for the purpose of protecting amplifier tube 7 against the effects of a possible short-circuit which would result if the condenser plates 5, 6 accidentally touched each other. Additionally, it is desirable to insulate the face of electrode 5, as by coating it with lacquer. In the embodiment illustrated the normal spacing between condenser plates 5 and 6, viz., the spacing when reed 6 is in its unflexed position, was chosen to be of the order of 0.005 inch. The output or anode circuit includes in series connection, starting with anode 11, electromagnet coil 2, the high-potential side (B+) of anode voltage source 9 (which in this embodiment was of 250 volts) the negative side (B—) of source 9, bias resistor $R_2$ and cathode 13, returning to anode 11. Resistor $R_2$, which may be of, say, 1,000 ohms, is commonly employed, as shown, with amplifier tubes of this type to maintain the grid at a suitable negative potential with respect to the cathode. Resistor $R_3$ is a grid leak of approximately 20 megohms. Resistor $R_1$ may be of about 200,000 ohms to maintain the screen grid at a desired potential. Condenser $C_1$ is a by-pass condenser of about 0.05 microfarad. Condenser $C_2$ is a larger by-pass condenser of about 25 microfarads for the purpose of maintaining the cathode substantially at zero alternating potential. The particular type of tube here illustrated having a metal jacket 10, this jacket or shell is connected to the B— side of voltage source 9 and to ground as shown.

It is desirable, although not essential, to include a potential-limiting device such as gas-discharge tube 8 in the circuit of coil 2 in order to limit the value of magnetic force which may be applied to reed 6. In the embodiment illustrated a gas-discharge tube of the type presently known as "R. C. A. 991" has been found satisfactory. Condenser $C_3$, which in this embodiment may be of 0.005 microfarad, is included for the purpose of tuning the amplifier output circuit, including coil 2, to a frequency at least broadly that of the natural period of the reed selected, viz., 1800 cycles per second. The value required for this capacity $C_3$ will, of course, depend largely on the inductance and distributed capacity of winding 2 in view of the frequency desired. In the embodiment here shown the winding 2 comprised about 7,000 turns of enamel-covered wire. It is to be understood that a suitable source of heating current is supplied to cathode-heater 14 of tube 7.

The electromechanical vibrator unit of this invention includes in itself several novel features from which result important advantages. As herein described and as shown in Fig. 5, it is employed as a light chopper or modulator in connection with apparatus for facsimile transmission. However, it is to be understood that the vibrator system of the present invention or significant parts thereof may be employed not only for modulating light beams in connection with measurements, optical and otherwise, but for many other purposes, as will be apparent to those skilled in the art.

Figure 2:
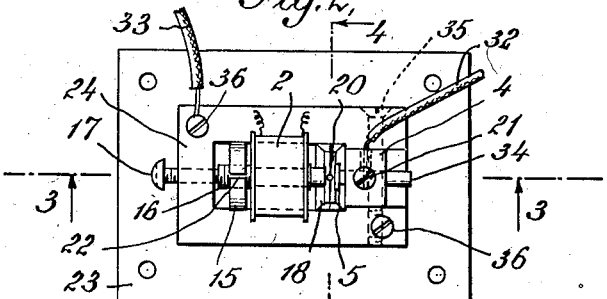
Fig. 2 is a plan view of an embodiment of an electromechanical vibrator unit according to the invention.
Figure 3:
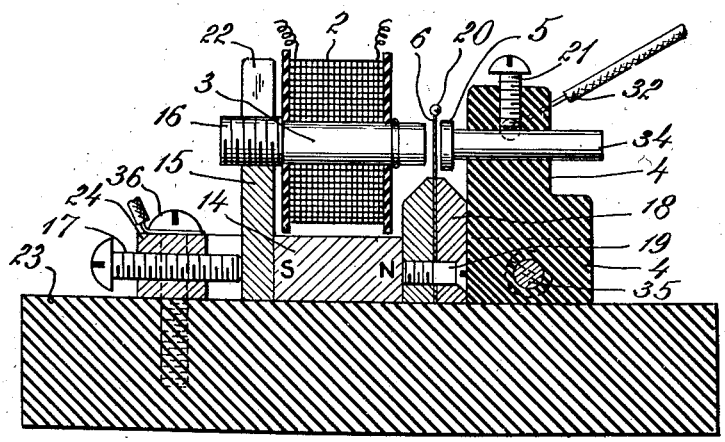
Fig. 3 is a vertical section taken along line 3—3 of Fig. 2.

Referring to Figs. 2, 3 and 4 the electromechanical vibrator unit is shown to be mounted on a base 23 of insulating material, and, as above described in connection with Fig. 1, comprises a vibrating reed 6 which is attracted periodically to core 3 of soft iron on which is wound coil 2. Reed 6 should be of flexible material which can be selected to have the desired natural frequency, and which preferably has a long vibrating life. For this purpose spring steel of about 0.003 inch in thickness, and about ¼ inch width has been found satisfactory. I have found that if the reed be cut at the end as shown in Fig. 4 so that the end portion which is free to vibrate is triangular in shape it can have a sufficiently high natural period and yet be long enough to provide space for the adjacent magnet core 3 and condenser plate 5 cooperating therewith as well as to allow for the light-modulating element or bead 20 at the end and to increase the amplitude of vibration. Additionally it has a longer vibrating life because the bending is more evenly distributed. The vibrating portion of the reed may also, or alternatively, be of tapering thickness from base to the end so that it is triangular in cross-section. The specific form of this triangle depends in any given case upon the elasticity of the material, the frequency at which vibration is desired, and the required length of the reed. Of course, the reed could be of rectangular shape under certain conditions. The reed is clamped, preferably in a vertical position, by means of clamp 18 which, as shown in Fig. 3, comprises two similar pieces held together with a clamp screw 19. At the end or apex of the triangular portion of the reed is secured a small lacquer bead 20, provided for the purpose of interrupting a light beam, as will later be described.

The electromagnet comprising coil 2 and core 3 is supported on core support 15 which may be of soft iron and thus similar to the material of core 3. In order to adjust the spacing between reed 6 and the adjacent pole face of core 3, the opposite end of the core is threaded through a suitable hole in the support 15. The portion of this support between the upper end thereof and the threaded hole is preferably slotted, as indicated at 22 of Fig. 2, for the purpose of providing frictional engagement between the support and the threaded end of the core, whereby the spacing is maintained at the adjustment desired. Beneath electromagnet 2, 3 and between support 15 and clamp 18 so as to be in the magnetic circuit is a permanent magnet 14, preferably of highly magnetizable material such as "Alnico." Any equivalent source of magnetic field could, of course, be substituted.

On the side of reed clamp 18 opposite permanent magnet 14 is an electrode supporting post 4 of insulating material. Through the upper part of this post is a hole through which the stem 34 of electrode 5 passes. Stem 34 may be slid in this hole for the purpose of adjusting the spacing between the face of electrode 5 and the adjacent surface of reed 6, after which it may be locked in this position by means of screw 21 which also acts as a binding post for connection lead 32. The spacing between the face of electrode 5 and the adjacent surface of reed 6 may conveniently be set by inserting therebetween a thickness gauge, moving stem 34 the required distance and then locking it against the gauge by means of screw 21. In the embodiment illustrated this spacing was 0.005 inch, as previously stated.

The component parts of the vibrator above mentioned may conveniently be assembled, as shown more clearly in Fig. 2, by mounting them on an insulating base 23 within a U-shaped frame 24. This frame may be of any suitable nonmagnetic material, and if it be of metal such as Duralumin or brass it may be used as a continuation of connection lead 33 to reed 6. For this purpose lead 33 may be electrically connected to frame 24 by placing it beneath the head of screw 36 which is employed also as one of the screws securing frame 24 to insulating base 23. To anchor the supporting post 4 in the assembly a screw 35 is passed through the free ends of frame 24 and also through the lower portion of post 4, as shown in Figs. 2 and 3. Through the closed end of frame 24 a clamp screw 17 may be threaded so that it bears against the outside of core support 15. Thus by turning clamp screw 17 the component parts 15, 14, 18 and 4 are secured together to form with frame 24 a unitary vibrator structure.

Although it will be evident to those skilled in the art that the electromechanical vibrator system herein described may readily be adapted to various uses, the invention has particular application to facsimile transmission. Accordingly, Fig. 5 illustrates a portion of a facsimile transmitter in which a vibrator according to the invention is employed. This transmitter includes a cylinder or drum 26 on which the picture or other matter to be transmitted is secured. Additional elements of the illustrated system include a suitable light source 25, lenses 31, reflecting prism 27, lens tube 28 containing lens 29, photo-electric cell 30 and a light chopper according to the invention comprising an electromechanical vibrator 1, as in Fig. 1, interposed to interrupt the light beam 37. From Fig. 5 it will be clear that as reed 6 is flexed and vibrates toward and away from electromagnet 2, the bead 20 on the end of reed 6 will swing across light beam 37 and interrupt it at the vibration frequency, providing the reed is so located with respect to the beam that the interruption occurs at or near the extreme of the swing of the reed. This means for interrupting the light beam has been found to be simple and satisfactory, but equivalent variations may be preferable under different circumstances. For example, the interruption effect may be the result of reflection of the light beam, in which event the reed 6 may have a polished portion which acts as a mirror, or a small mirror may be attached to a suitable portion of the reed. If for this or any other reason the reed be composed of non-magnetic material it should be suitably attached to a portion of magnetic material which in turn is in magnetic relation to core 3.

One of the advantages of the present invention is that the vibrator unit as illustrated in Figs. 2-4, inclusive, may readily be constructed to have extremely small dimensions. For example the overall length of the entire vibrator unit need not exceed 1¾ inches, the other component parts having corresponding dimensions. Thus if desired, the unit may be placed inside of a sealed envelope containing either a vacuum or an inert gas to protect it against dust and changes in humidity.

What is claimed is:

1. A vibrator unit including in combination: a closed magnetic circuit comprising in series an electromagnet core, a magnetic field source, magnetic means supporting said core and magnetically coupling said core to said field source, and a vibrating reed of magnetic material positioned to magnetically couple said field source to said core, said reed being fixed at one end and having a first flexible portion spaced at vibrating distance from a face of said core; a condenser electrode positioned in electrostatic spacial relation to a second flexible portion of said reed, means for adjusting the spacing between said face and said first portion of said reed, and means for adjusting the spacing between said electrode and said second portion of said reed.

2. A vibrator unit including in combination, an electromagnet having a core of magnetic material, one end of said core terminating in a pole face and the other end thereof terminating in a threaded portion, a core support of magnetic material, said threaded portion being adjustably secured in a threaded hole in said support near one end thereof, a reed clamp of magnetic material spaced from the other end of said support, a permanent magnet proportioned to fill the space between said clamp and said support, a reed of magnetic material secured in said clamp and extending beyond said clamp toward said core to form a vibrating portion having two sides, a post of non-magnetic material adjacent said clamp on the side thereof opposite said permanent magnet, an insulated condenser electrode adjustably supported by said post in electrostatic relation to one side of said vibrating portion of said reed, the other side of said reed being in magnetic relation to said pole face of said core, and means for securing the component parts of said unit in a unitary structure.

3. In an electromechanical vibrator, the combination which includes an electromagnet, a condenser electrode having a face, an adjustable clamp, and a two-sided reed having a non-vibrating portion and a vibrating portion of flexible flat magnetic material adjustably positioned in said clamp with one side in magnetic relation to a pole of said electromagnet and with the other side in electrostatic relation to said condenser face, the flexible vibrating portion of said reed being triangularly shaped with the base of the triangle fixed in said clamp, and the apex of the triangle comprising a flexible free end extending beyond said pole and said face.

4. In an electromechanical light-modulating vibrator, the combination which includes an electromagnet having a pole, a condenser electrode having a face, a clamp a flat reed having two parallel sides and a non-vibrating portion adjustably secured in said clamp and a vibrating portion of flexible magnetic conducting material extending beyond said clamp, said flexible vibrating portion being triangularly shaped with the base of the triangle fixed at said clamp and the apex of the triangle comprising a free end and extending beyond said pole and said face and positioned with one side adjacent to and in magnetic relation to said electromagnet and with the other side in electrostatic relation to said electrode face whereby to form with said face a condenser the capacity of which is periodically varied by vibration of said reed, and light-modulating means secured to said vibrating portion at said apex whereby a light beam may be modulated by said means simultaneously with said variation in capacity as said reed vibrates, means for adjusting the capacity of said condenser, and means for adjusting the spacing between said pole and the side of said reed adjacent thereto.

5. A vibrator unit including in combination: a closed magnetic circuit comprising in a series magnetic path an electromagnetic core, a magnetic field source, a magnetic post supporting said core and magnetically coupling one end of said core and one end of said field source, and a vibrating reed clamped at one end and free at the other end and positioned to magnetically couple the other ends of said field source and said core, the free end of said reed having a first portion spaced at vibrating distance from a face of said core; a condenser electrode positioned in electrostatic spacial relation to a second portion of the free end of said reed, means for adjusting the spacing between said face and said first portion of said reed, and means for adjusting the spacing between said electrode and said second portion of said reed.

6. A vibrator unit including in combination, an electromagnet having a core of magnetic material, one end of said core terminating in a pole face, a core support of magnetic material, the other end of said core being adjustably secured in said support near the upper end thereof, a reed clamp comprised at least partly of magnetic material spaced from the lower end of said support, a magnet positioned between said clamp and said support and in magnetic relation thereto, a reed of magnetic material secured in said clamp and extending beyond said clamp toward said core to form a vibrating portion, a support of non-magnetic material adjacent said clamp, a condenser electrode adjustably supported by said non-magnetic support in electrostatic relation to one side of said vibrating portion of said reed, the other side of said reed being in magnetic relation to said pole face of said core, and means for securing the component parts of said unit in a unitary structure.

7. A vibrator unit including in combination, an electromagnet having a core of magnetic material, one end of said core terminating in a pole face, a core support of magnetic material, the other end of said core being secured in said support near the upper end thereof, a reed clamp comprised at least partly of magnetic material spaced from the lower end of said support, a magnet positioned between said clamp and said support and in magnetic relation thereto, a reed of magnetic material secured in said clamp and extending beyond said clamp toward said core to form a vibrating portion, said reed being in magnetic relation to said pole face, means for adjusting the spacing between said pole face and said reed, a condenser electrode supported in electrostatic relation to said vibrating portion of said reed, means for adjusting the effective electrostatic capacity between said electrode and said reed, and means for securing the component parts of said unit in a unitary structure.

FRANK T. TURNER.